Nov. 7, 1933.  W. SCHAAKE  1,934,510
CURRENT COLLECTING DEVICE
Filed Feb. 6, 1932
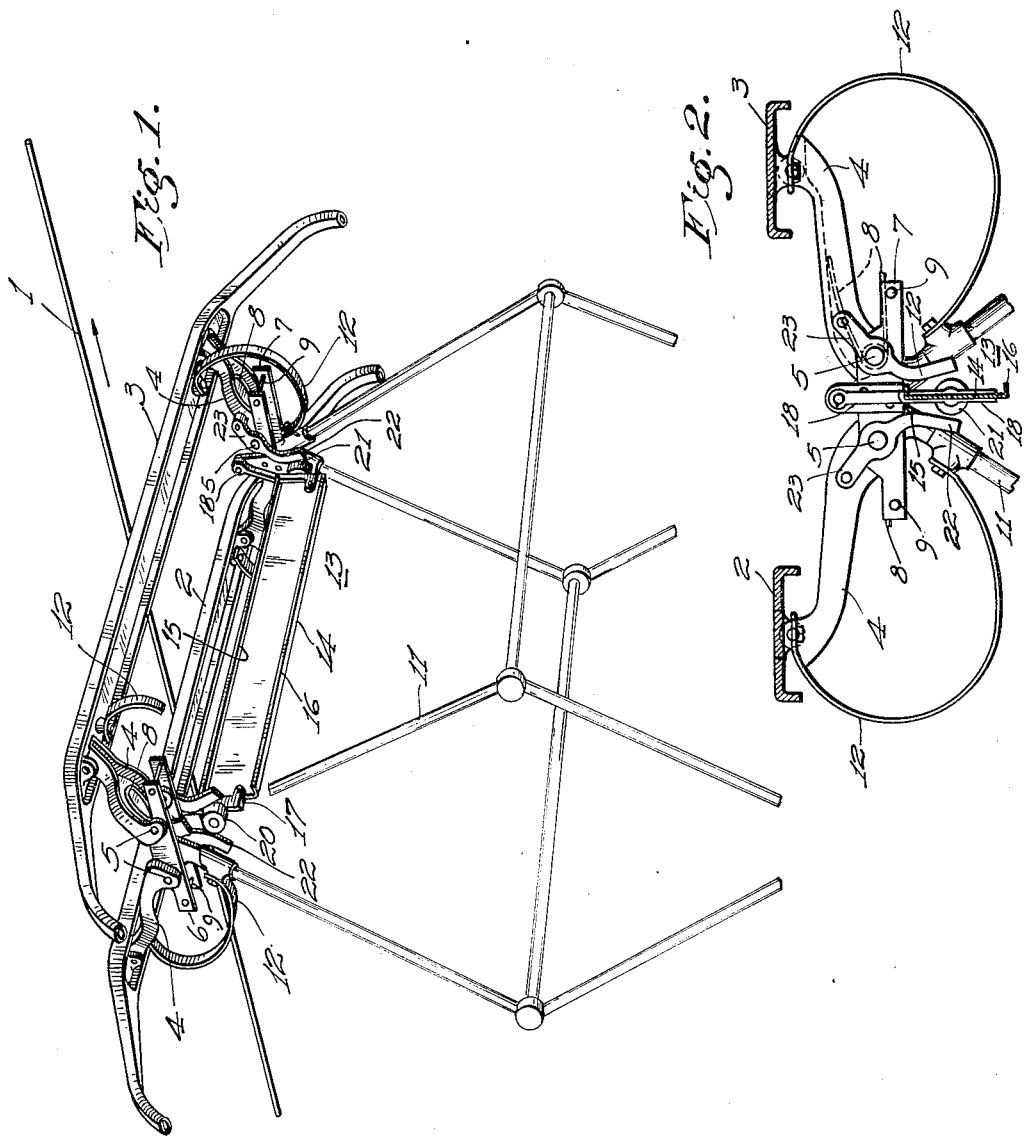
WITNESSES:—
INVENTOR
William Schaake.
ATTORNEY Patented Nov. 7, 1933

1,934,510

UNITED STATES PATENT OFFICE 1,934,510

CURRENT-COLLECTING DEVICE

William Schaake, Pittsburgh, Pa., assignor to Westinghouse Electric & Manufacturing Company, a corporation of Pennsylvania Application February 6, 1932. Serial No. 591,371

7 Claims. (Cl. 191—55)

My invention relates, generally, to current-collecting devices for electric vehicles and it has particular relation to pantograph structures for supporting slider shoes in engagement with an overhead trolley conductor.

When electric vehicles are operated at high speeds, such as from 70 to 80 miles an hour, it has been found that the current-collecting mechanism, which is utilized for conducting current from an overhead trolley conductor to the motors and auxiliary equipment of the vehicle, tends to alternately engage and disengage the conductor, thereby producing undesirable arcing between the current-collector and the conductor. This arcing causes a rapid wearing of both the overhead conductor and the current-collecting device. It has been observed that the current-collector tends to leave the wire because of the extreme wind pressures that are exerted on the collecting mechanism due to the high speed at which the vehicle travels along the track.

Accordingly, it is an object of my invention to provide a current-collector for electric vehicles which shall be simple and efficient in operation and readily and economically manufactured and installed.

A more specific object of my invention is to provide for automatically adjusting the contact pressure between a current collector and a trolley conductor in accordance with the speed at which the collector is moved along the conductor.

Other objects of my invention will, in part, be obvious and, in part, appear hereinafter.

My invention, accordingly, is disclosed in the embodiment hereof shown in the accompanying drawing, and comprises the features of construction, combination of elements and arrangement of parts exemplified in the construction hereinafter set forth, and the scope of the application of which will be indicated in the appended claims.

For a more complete understanding of the nature and scope of my invention, reference may be had to the following detailed description taken in connection with the accompanying drawing, in which Figure 1 is a perspective view, showing a current-collector constructed in accordance with this invention, and Fig. 2 is a longitudinal sectional view thereof showing more clearly certain details of construction of the current collector shown in Fig. 1.

Referring now to the drawing, the reference character 1 designates an overhead trolley conductor from which electric power may be conducted for propelling an electric vehicle. In order to provide for collecting large currents from the overhead conductor 1 at high speeds, a pair of slider shoes 2 and 3 of well-known construction are provided. These slider shoes are pivotally mounted on shoe levers 4 which, in turn, are pivotally mounted by means of pins 5 on bases 6 and 7. As illustrated in the drawing, the slider shoes 2 and 3 are biased to a predetermined position by means of coil springs 8, which are mounted around pins 5 and are disposed to cooperate with the shoe levers 4 and tie rods 9 located at the ends of the bases 6 and 7.

The slider shoes 2 and 3 may be raised and maintained in engagement with the conductor 1 by any suitable means, such as a pantograph structure 11, which is merely shown diagrammatically and which may be constructed in accordance with any of the structures well known to the art. In order to conduct the current directly from the slider shoes 2 and 3 to the pantograph structure 11, the customary flexible shunts 12 are used, thereby providing for conducting the current around the hinged points in the collecting device, rather than through them.

With a view to adjusting the contact pressure between one or the other of the slider shoes 2 and 3 and the overhead conductor 1, a wind vane, shown generally at 13, is provided. The wind vane 13 comprises a main body member 14 which may be formed from a single sheet of any suitable material, such as steel, having the edges 15 and 16 turned up, as illustrated, to increase the rigidity thereof, and a pair of supporting brackets 17 and 18 secured to the ends of the main body member.

As shown in the drawing, the supporting brackets 17 and 18 are pivotally suspended from the bases 6 and 7, thereby permitting the wind vane 13 to swing freely when pressure is applied thereto. When the current collector is moved in the direction indicated by the arrow, it will be readily understood that the wind vane 13 will be moved in the opposite direction in response to the wind pressure exerted thereon.

In order to transmit the movement of the wind vane 13, in this case, to the rear or trailing slider shoe 2, a pair of rollers 20 and 21 are mounted on the brackets 17 and 18, at opposite ends of the main body member 14, and are disposed to engage the depending portions 22 of operating levers 23 which are pivotally mounted on the bases 6 and 7 and on the shoe levers 4, as shown. It will be readily apparent that the greater the pressure that is applied to the wind vane 13 as a result of a high rate of speed, a correspondingly greater pressure will be applied to the trailing slider shoe 2, thereby increasing the contact pressure between the shoe and overhead conductor. It will also be observed that, in this instance, the contact pressure between the forward or leading slider shoe 3 and the overhead conductor 1 will be unaffected by the action of the wind vane 13.

In the event that the direction of movement of the current collector is reversed from that assumed above, it will be understood that the wind vane 13 will serve to increase the contact pressure between the slider shoe 3 which then becomes the trailing shoe and the overhead conductor 1, and will be ineffective to vary the contact pressure between the slider shoe 2 and the overhead conductor.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. In a current-collector, in combination, a plurality of slider shoes disposed to engage an overhead trolley conductor, and means moving independently of the movement of the shoes for adjusting the contact pressure between one of the slider shoes and the conductor in accordance with the rate and direction of movement of the shoes along the conductor without affecting the contact pressure between the other shoe and the conductor.

2. In a device for collecting current from an overhead trolley conductor, in combination, a pair of sliding contact shoes for engaging said conductor, and a wind vane disposed to cooperate with one or the other of said shoes for adjusting the contact pressure between only one of the shoes and the wire depending on the direction in which the device is moved.

3. In a current-collector, in combination, a pair of pivotally-mounted slider shoes disposed to engage an overhead trolley conductor, means for supporting said slider shoes in engagement with the conductor, and a wind vane pivotally mounted on said supporting means and disposed to cooperate with one or the other of said shoes for adjusting the contact pressure between only one of the shoes and the conductor depending on the direction in which the current-collector is moved along the conductor.

4. In a current-collector, in combination, a pair of slider shoes disposed to engage an overhead trolley conductor, a plurality of pivotally-mounted levers for supporting the slider shoes, a movable wind vane, and means comprising a plurality of operating levers for transmitting the movement of said wind vane only to one or the other of said slider shoes depending on the direction in which the current-collector is moved.

5. A wind vane for use with a current-collector provided with a pair of slider shoes comprising, in combination, a main body member, a pair of supporting brackets secured to the ends of said main body member and adapted to be pivotally mounted on the current collector, and a pair of rollers carried by said supporting levers for use in transmitting the movement of said main body member to the slider shoes.

6. A wind vane for use with a current collector provided with a pair of slider shoes comprising, in combination, an elongated main body member provided with reenforced edges, a pair of supporting brackets secured to the ends of said main body member and adapted to be pivotally mounted on the current-collector, and a pair of rollers carried by said supporting levers and disposed to the movement of said main body member to the slider shoes.

7. In a current-collector, in combination, a pantograph supporting structure, a pair of base members mounted on said pantograph structure, a pair of shoe levers pivotally mounted on each of said base members, a pair of slider shoes pivotally mounted on said shoe levers and disposed to engage a trolley conductor, a plurality of operating levers each pivotally mounted on one of said bases and connected to one of said shoe levers, each of said operating levers being provided with a downwardly extending portion, a wind vane pivotally mounted between said bases and extending parallel to said slider shoes and a pair of rollers mounted on the ends of said wind vane and disposed to engage the downwardly extending portions of said operating levers.

WILLIAM SCHAAKE.